United States Patent
Cathier

(10) Patent No.: US 7,447,342 B2
(45) Date of Patent: Nov. 4, 2008

(54) METHOD AND SYSTEM FOR USING CUTTING PLANES FOR COLON POLYP DETECTION

(75) Inventor: Pascal Cathier, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 660 days.

(21) Appl. No.: 10/945,130

(22) Filed: Sep. 20, 2004

(65) Prior Publication Data

US 2005/0078859 A1    Apr. 14, 2005

Related U.S. Application Data

(60) Provisional application No. 60/504,714, filed on Sep. 22, 2003.

(51) Int. Cl.
*G06K 9/00* (2006.01)

(52) U.S. Cl. .......................... 382/128; 382/154; 378/21

(58) Field of Classification Search ................ 382/100, 382/128, 129, 130, 131, 132, 133, 154, 168, 382/171, 181, 193, 199, 203, 232, 243, 260, 382/274, 276, 282, 285–293, 305, 134; 600/425, 600/476, 420; 378/4, 21, 23, 24, 25

See application file for complete search history.

(56) References Cited

U.S. PATENT DOCUMENTS

| 6,609,021 | B1 * | 8/2003 | Fan et al. ................... 600/425 |
| 6,947,784 | B2 * | 9/2005 | Zalis .......................... 600/425 |
| 7,035,681 | B2 * | 4/2006 | Johnson et al. ............. 600/420 |
| 7,103,401 | B2 * | 9/2006 | Schomacker et al. ........ 600/476 |
| 7,224,827 | B2 * | 5/2007 | Acar et al. .................. 382/131 |

FOREIGN PATENT DOCUMENTS

WO    WO 01/78017 A2    10/2001

OTHER PUBLICATIONS

Hiroyuki Yoshida et al., "Computer-Aided Diagnosis Scheme For Detection of Polyps at CT Colonography", URL http://radiographics. rsnajnis.org.cgi/content/full/22/4/963>, vol. 22, 2002, pp. 9630979.
Gokturk S. B., et al., "A Statistical 3-D Pattern Processing Method For Computer-Aided Detection of Polyps in CT Colonography", IEEE Transactions on Medical Imaging, vol. 20, Dec. 2001, pp. 1251-1260.
International Search Report including Notification of Transmittal of the International Search Report, International Search Report and Written Opinion of the International Search Authority, (2004).

* cited by examiner

*Primary Examiner*—Seyed Azarian

(57) ABSTRACT

A method of identifying a polyp in a digital image of a colon, wherein said image comprises a plurality of intensities corresponding to a domain of voxels in a 3-dimensional space, is provided. The method includes providing the image with a set of 3 mutually orthogonal axes, providing a plurality of cutting planes each at a different orientation with respect to the image axes, centering, for each voxel in the image, each of the cutting planes about a central voxel, determining, for each of the plurality of cutting planes about each voxel in the image, an intersection of the cutting plane with the colon, and examining a trace of the cutting plane within said intersection, and marking, where the trace of each cutting plane is small and round, those voxels in the intersection for further analysis.

22 Claims, 4 Drawing Sheets

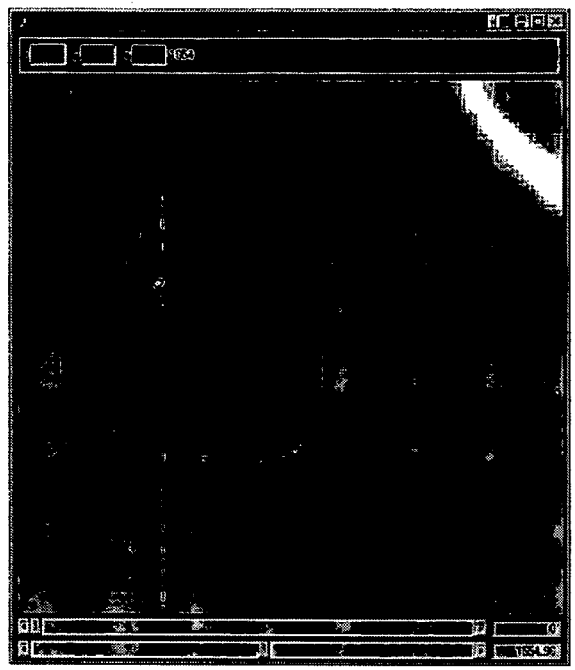
Fig. 3: Original colon CT slice presenting a polyp
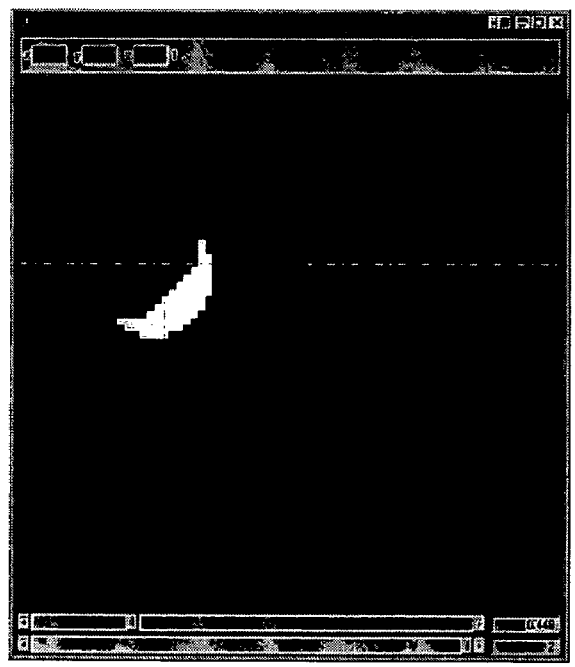
Fig. 4: detected polyp, in white

METHOD AND SYSTEM FOR USING CUTTING PLANES FOR COLON POLYP DETECTION

CROSS REFERENCE TO RELATED UNITED STATES APPLICATIONS

This application claims priority from "Cutting planes for colon polyp detection", U.S. Provisional Application No. 60/504,714 of Pascal Cathier, filed Sep. 22, 2003, the contents of which are incorporated herein by reference.

TECHNICAL FIELD

This invention is directed to recognizing structures, specifically colon polyps, in a digital medical image.

BACKGROUND

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray film radiography, computed tomography ("CT") imaging, magnetic resonance imaging ("MRI"), ultrasound ("US") and nuclear medicine imaging techniques, such as positron emission tomography ("PET") and single photon emission computed tomography ("SPECT"). Digital images can also be created from analog images by, for example, scanning analog images, such as typical x-rays, into a digitized form. However, the large amount of data in digital images is generally difficult and tedious for a human, such as a physician, to interpret without additional aid. Computer-aided diagnosis ("CAD") systems play a critical role in aiding the human, especially in the visualization, segmentation, detection, registration, and reporting of medical pathologies.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system.

One of the more critical CAD tasks includes the screening and early detection of various types of cancer from a volume data (e.g., a CT volume data). Many cancers, such as colon cancer, have shown a decrease in mortality rates resulting from the early detection and removal of cancerous tumors. Pathologies are typically spherical or hemispherical in geometric shape. In many cases, these sphere-like pathologies are attached to linear or piece-wise linear surfaces. Unfortunately, existing methods generally do not detect characteristic symptoms of various cancers until the advanced stages of the disease. Therefore, a primary goal in advancing preventive cancer screening is to provide for earlier detection of the characteristic symptoms.

SUMMARY OF THE INVENTION

In one aspect of the invention, there is provided a method of identifying a polyp in a digital image of a colon, wherein the image comprises a plurality of intensities corresponding to a domain of voxels in a 3-dimensional space. The method includes providing the image with a set of 3 mutually orthogonal axes, centering, for each voxel in the image, a cutting plane about a central voxel at a first orientation with respect to the axes of the image, determining an intersection of the cutting plane with the colon, and examining a trace of the image within the intersection, and selecting, where the trace is small and round, those voxels in the intersection for further analysis.

In a further aspect of the invention, the trace is about 2 orders of magnitude smaller relative to the size of the image.

In a further aspect of the invention, the steps of centering, determining, and selecting are repeated for a plurality of cutting planes, each at a different orientation with respect to the image axes.

In a further aspect of the invention, the plurality of cutting places are uniformly distributed on an orientation sphere.

In a further aspect of the invention, the cutting planes are picked so that each plane has a normal with coordinates (A,B,C), where A, B, and C are integers between −1 and 1, and wherein A, B, and C cannot all be zero.

In a further aspect of the invention, A, B, and C are subject to the constraint that $|A|+|B|+|C|<=2$.

In a further aspect of the invention, the method includes the step of labelizing those voxels selected for further analysis to identify and label one or more connected clusters from the selected voxels.

In a further aspect of the invention, the method includes the step of determining the size of each of the one or more connected clusters.

In a further aspect of the invention, the method includes the step of analyzing each of the one or more connected clusters for circularity or sphericity.

BRIEF DESCRIPTION OF THE DRAWINGS

FIG. 3 depicts an axial slice of a colon CT image.

FIG. 4 depicts a polyp in a colon CT image identified by the use of cutting planes.

DETAILED DESCRIPTION OF THE PREFERRED EMBODIMENT

Figure 1:
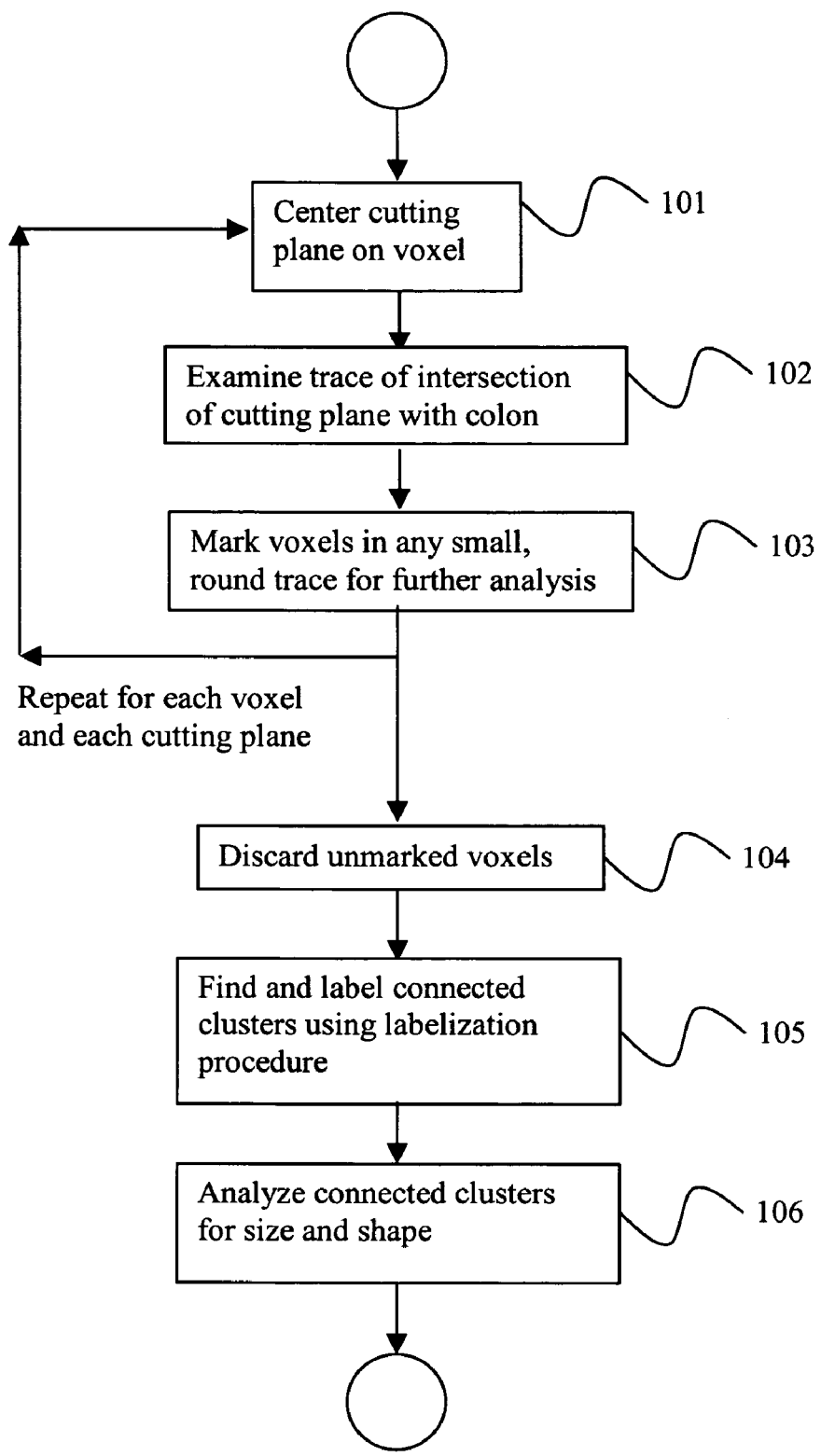
FIG. 1 depicts a flow chart of a preferred method of the invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The present invention is preferably performed on a computer system, such as a Pentium®-class personal computer, running computer software that implements the algorithm of the present invention. The computer includes a processor, a memory and various input/output means. A series of digital images representative of a thoracic volume are input to the computer. The terms "digital" and "digitized" as used herein will refer to images or volumes, as appropriate, in a digital or digitized format acquired via a digital acquisition system or via conversion from an analog image.

Prior to cutting the volume, however, the image can be preprocessed to distinguish the colon from other structures in the image. High accuracy of algorithms is crucial for successful nodule detection, and preprocessing generally reduces the complexity of the domain of the function to be estimated. Preprocessing is generally more effective when it is based on known characteristics of what is being imaged. Preprocessing algorithms are well known in the art, and include techniques such as smoothing, morphological and regularization. In CT images, a simple threshold would be enough to differentiate between lumen and tissue, but further preprocessing would be needed to eliminate other boundaries, such as external air, lung, small intestine, etc.

Referring now to FIG. 1, in a preferred embodiment of the invention, cutting planes are used to locate polyps in a colon CT image. For each voxel in the image, at step 101, the volume is cut by different planes having different orientations with respect to the axes of the image, each centered on the voxel in question, hereinafter referred to as the central voxel. There is no limitation on the number of orientations that can used, but in a preferred embodiment, it has been found that a set of 9 to 13 cutting planes at different orientations is sufficient. It is preferable that the orientations of these cutting planes be more or less uniformly distributed on the orientation sphere. In a preferred embodiment, the planes are picked so that the normal to the planes have coordinates (A,B,C), where A,B,C are integers between −1 and 1, subject to the restriction that they can't all be zero. There are 13 planes that correspond to all possibilities, while 9 planes correspond to the constraint $|A|+|B|+|C|<=2$. Other criteria for picking cutting planes are possible, and are within the scope of the invention.

In each of these planes, at step 102, one then examines the trace of the volume, which is the value of the volume in the plane. Since the image has most likely been preprocessed to distinguish the colon from the background, one is interested in the trace where the cutting plane intersects the colon. A small and round trace is likely to be part of a polyp, since there are not other small round structures in the colon wall. In an image that has a typical dimension of about 512 voxels per dimension, a small trace would be about two orders of magnitude smaller, or about 3 voxels per dimension. Therefore, the appearance of traces defining small and round regions in a set of cutting planes about a voxel is indicative of a polyp. In examining the trace, every voxel is considered exactly once per plane. For each set of plane orientations, there is exactly the correct number of planes so that every voxel in a neighborhood of the central voxel is considered. The preferred choice of plane orientation ensures that all voxels that might be in a polyp are included in one of the cutting planes centered on the central voxel. With other, non-integer, plane orientations, it might be possible have voxels be in a polyp but not be included in any of the cutting planes. Those points in a small, round region defined by the trace can be marked as positive at step 103 after a given plane with a given orientation has been completed for each voxel. Thus, each voxel has a chance to be picked up as a polyp for every plane orientation. If there are 13 plane orientations, each voxel will be cut through by 13 planes, and has 13 chances to become a positive. At the end, a voxel is positive if it has been found positive at any orientation. It is a binary "or" of all plane results. After each voxel has been cut by each of the planes in the set of cutting planes, those points that remain unmarked are discarded, at step 104, from further analysis.

The steps of centering a cutting plane of a given orientation on a given central pixel, examining the trace of the intersection of the cutting plane with the colon, and marking voxels for further analysis is repeated for every voxel in the volume and every cutting plane of a different orientation in the set of cutting planes.

Figure 2:
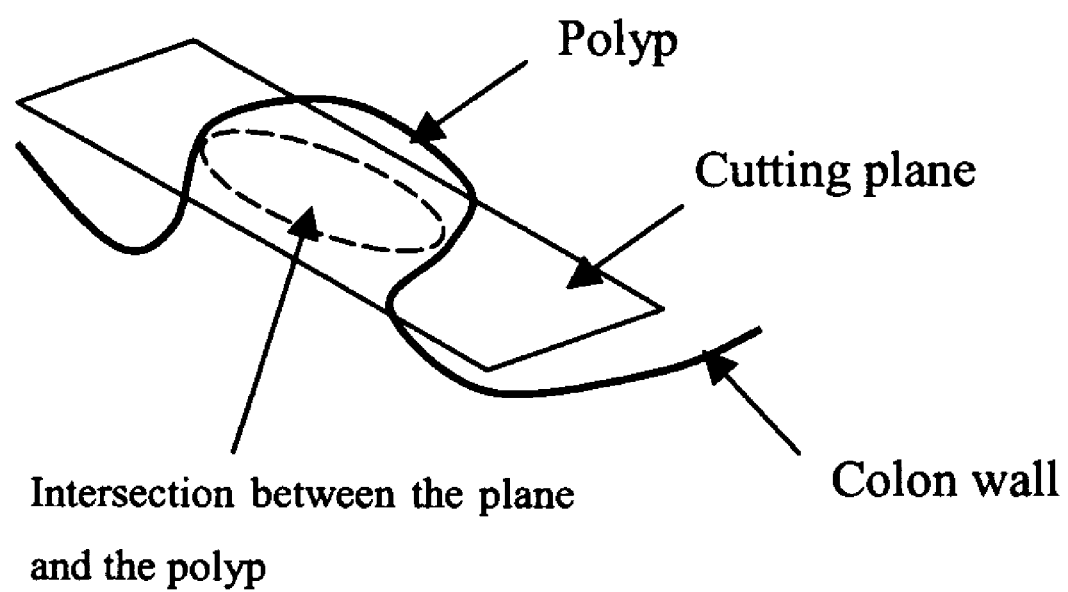
FIG. 2 depicts a cutting plane intersecting a colon.

FIG. 2 illustrates a cutting plane intersecting a polyp. The trace is the region inside the dotted line in the figure. FIG. 3 shows an axial slice of an original colon CT volume, presenting a polyp indicated by the cross hairs.

FIG. 4 shows the result of the cutting plane detection algorithm, where the white points are the points where a plane intersects the polyp in a small section unattached to the colon wall. For this example, 13 plane orientations have been used, covering the whole image, so that every given voxel is contained in 13 of these cutting planes.

At step 105, clusters of voxels in the image can be found using a labelization procedure. One well known procedure is the connected component labeling ("CCL") procedure, which identifies and labels each connected component in an image. Usually, the label is an integer number, greater than or equal to 1, with the background set to 0. The input of a CCL algorithm is a binary image, such as the output of the plane cutting procedure, where, for example, the background is set to 0 and voxels in objects of interest are set to 1. The output of the CCL procedure is an image that has the same size as the input image, with the background voxels still set to 0 and the object voxels having integer values starting from 1. Thus, the CCL procedure assigns a number to each object of the image. Once connected clusters have been identified, they can be further analyzed at step 106 to determine characteristics such as cluster size and circularity or sphericity, used to discriminate patterns belonging to potential polyps from others. Methods for determining sphericity of a structure in a medical image form the subject matter of this inventor's co-pending pending patent applications, "Method and System for Using Structure Tensors to Detect Lung Nodules and Colon Polyps", U.S. patent application Ser. No. 10/915,047, filed Aug. 10, 2004, and "Method and System for Fast Normalized Cross-Correlation Between an Image and a Gaussian for Detecting Spherical Structures", U.S. patent application Ser. No. 10/915,075, filed Aug. 10, 2004.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
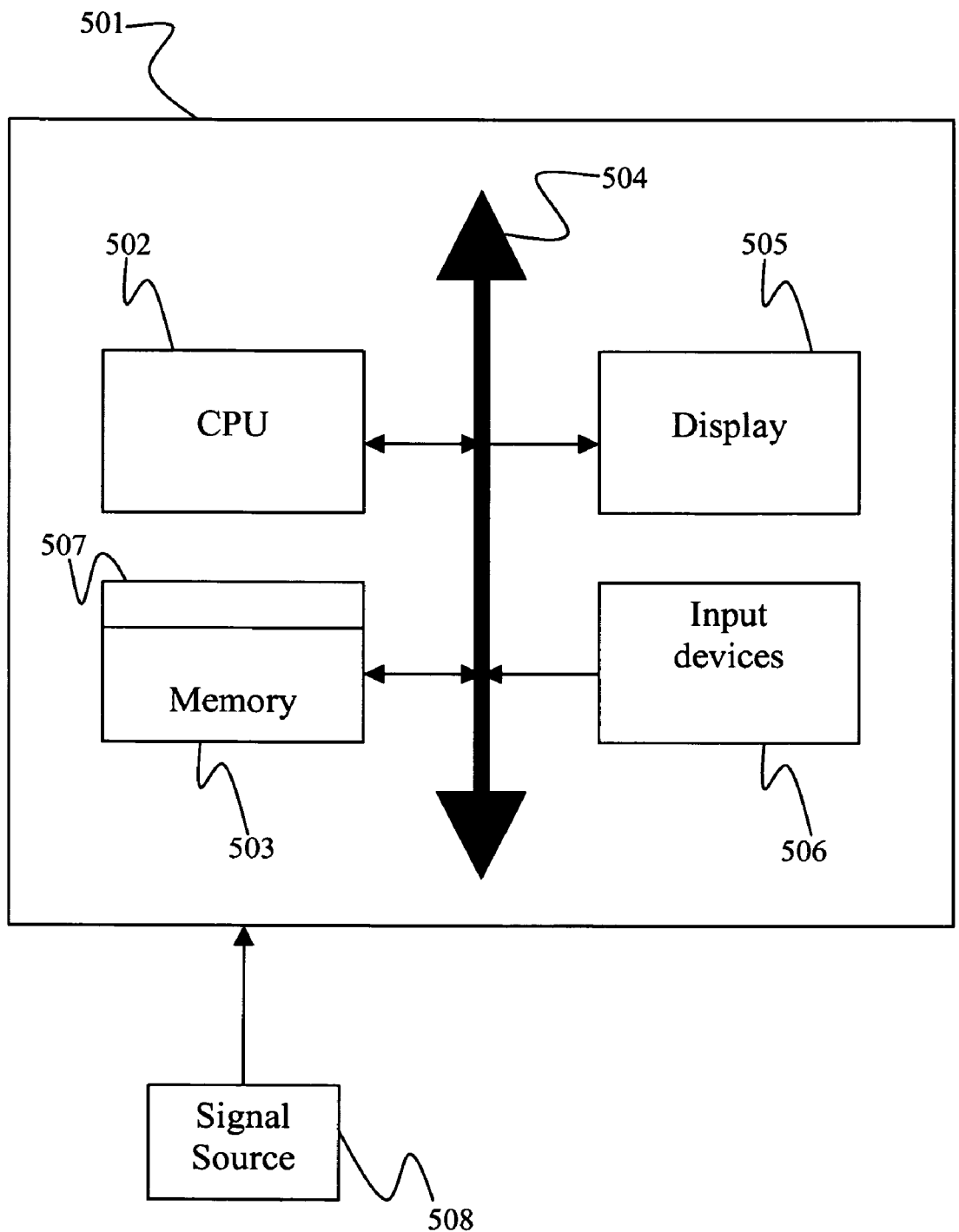
FIG. 5 depicts an exemplary computer system for implementing a preferred embodiment of the invention.

Referring now to FIG. 5, according to an embodiment of the present invention, a computer system 501 for implementing the present invention can comprise, inter alia, a central processing unit (CPU) 502, a memory 503 and an input/output (I/O) interface 504. The computer system 501 is generally coupled through the I/0 interface 504 to a display 505 and various input devices 506 such as a mouse and a keyboard. The support circuits can include circuits such as cache, power supplies, clock circuits, and a communication bus. The memory 503 can include random access memory (RAM), read only memory (ROM), disk drive, tape drive, etc., or a combinations thereof. The present invention can be implemented as a routine 507 that is stored in memory 503 and executed by the CPU 502 to process the signal from the signal source 508. As such, the computer system 501 is a general purpose computer system that becomes a specific purpose computer system when executing the routine 507 of the present invention.

The computer system 501 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of identifying a polyp in a digital image of a colon, wherein said image comprises a plurality of intensities corresponding to a domain of voxels in a 3-dimensional space, said method comprising the steps of:

providing the image with a set of 3 mutually orthogonal axes;

centering, for each voxel in the image, a cutting plane about a central voxel at a first orientation with respect to the axes of the image;

determining an intersection of the cutting plane with the colon, and examining a trace of the image within said intersection; and selecting, where the trace is small and round, those voxels in the intersection for further analysis, wherein said steps of centering, determining, and selecting are repeated for a plurality of cutting planes, each at a different orientation with respect to the image axes, wherein said plurality of cutting places are uniformly distributed on an orientation sphere, and wherein said cutting planes are picked so that each plane has a normal with coordinates (A,B,C), where A, B, and C are integers between −1 and 1, and wherein A, B, and C cannot all be zero.

2. The method of claim 1, wherein A,B, and C are subject to the constraint that |A|+|B|+|C|<=2.

3. The method of claim 1, wherein the trace is about two orders of magnitude smaller than the image.

4. The method of claim 1 further comprising the step of labelizing those voxels selected for further analysis to identify and label one or more connected clusters from the selected voxels.

5. The method of claim 4, further comprising the step of determining the size of each of the one or more connected clusters.

6. The method of claim 4, further comprising the step of analyzing each of the one or more connected clusters for circularity or sphericity.

7. A method of identifying a polyp in a digital image of a colon, wherein said image comprises a plurality of intensities corresponding to a domain of voxels in a 3-dimensional space, said method comprising the steps of:

providing the image with a set of 3 mutually orthogonal axes;

providing a plurality of cutting planes each at a different orientation with respect to the image axes, wherein said plurality of cutting places are uniformly distributed on an orientation sphere, and wherein said cutting planes are picked so that each plane has a normal with coordinates (A,B,C),where A,B, and C are integers between −1 and 1, and wherein A,B, and C cannot all be zero;

centering, for each voxel in the image, each of said cutting planes about a central voxel;

determining, for each of said plurality of cutting planes about each voxel in the image, an intersection of the cutting plane with the colon, and examining a trace of the cutting plane within said intersection; and marking, where the trace of each cutting plane is small and round, those voxels in the intersection for further analysis.

8. The method of claim 7, wherein A,B, and C are subject to the constraint that |A|+|B|+|C|<=2.

9. The method of claim 7, wherein the trace is about two orders of magnitude smaller than the image.

10. The method of claim 7, further comprising the step of labelizing those voxels marked for further analysis to identify and label one or more connected clusters from the marked voxels.

11. The method of claim 10, further comprising the step of determining the size of each of the one or more connected clusters.

12. The method of claim 10, further comprising the step of analyzing each of the one or more connected clusters for circularity or sphericity.

13. A program storage device readable by a computer, tangibly embodying a program of instructions executable by the computer to perform the method steps for identifying a polyp in a digital image of a colon, wherein said image comprises a plurality of intensities corresponding to a domain of voxels in a 3-dimensional space, said method comprising the steps of:
provided the image with a set of 3 mutually orthogonal axes;
centering, for each voxel in the image, a cutting plane about a central voxel at a first orientation with respect to the axes of the image;
determining an intersection of the cutting plane with the colon, and examining a trace of the image within said intersection; and
selecting, where the trace is small and round, those voxels in the intersection for further analysis, wherein said steps of centering, determining, and selecting are repeated for a plurality of cutting planes, each at a different orientation with respect to the image axes, wherein said plurality of cutting places are uniformly distributed on an orientation sphere, and wherein said cutting planes are picked so that each plane has a normal with coordinates (A,B,C), where A, B, and C are integers between −1 and 1, and wherein A, B, and C cannot all be zero.

14. The computer readable program storage device of claim 13, wherein A,B, and C are subject to the constraint that |A|+|B|+|C|<=2.

15. The computer readable program storage device of claim 13, wherein the trace is about two orders of magnitude smaller than the image.

16. The computer readable program storage device of claim 13, the method steps further comprising the step of labelizing those voxels selected for further analysis to identify and label one or more connected clusters from the selected voxels.

17. The computer readable program storage device of claim 16, the method steps further comprising the step of determining the size of each of the one or more connected clusters.

18. The computer readable program storage device of claim 16, the method steps further comprising the step of analyzing each of the one or more connected clusters for circularity or sphericity.

19. A method of identifying a polyp in a digital image of a colon, wherein said image comprises a plurality of intensities corresponding to a domain of voxels in a 3-dimensional pace, said method comprising the steps of:
providing the image with a set of 3 mutually orthogonal axes;
providing a plurality of cutting planes each at a different orientation with respect to the image axes, wherein said cutting planes are picked so that each plane has a nonnal with coordinates (A,B,C), where A, B and C are integers between −1 and 1, and herein A,B, and C cannot all be zero;
centering, for each voxel in the image, each of said cutting planes about a central voxel;
determining, for each of said plurality of cutting planes about each voxel in the image, an intersection of the cutting plane with the colon, and examining a trace of the cutting plane within said intersection;
marking, where the trace of each cutting plane is small and round, those voxels in the intersection; and
labelizing the marked voxels to identify and label one or more connected clusters from the marked voxels.

20. The method of claim 19, further comprising the step of determining the size of each of the one or more connected clusters.

21. The method of claim 20, further comprising the step of analyzing each of the one or more connected clusters for circularity or sphericity.

22. The method of claim 19, wherein the trace is about two orders of magnitude smaller than the image.

* * * * *